United States Patent
Ng

(10) Patent No.: US 8,352,083 B2
(45) Date of Patent: Jan. 8, 2013

(54) SYSTEM AND METHOD FOR ESTABLISHING LOCAL CONTROL OF A SPACE CONDITIONING LOAD DURING A DIRECT LOAD CONTROL EVENT

(75) Inventor: Howard Ng, Norcross, GA (US)

(73) Assignee: Comverge, Inc., Norcross, GA (US)

( * ) Notice: Subject to any disclaimer, the term of this patent is extended or adjusted under 35 U.S.C. 154(b) by 119 days.

(21) Appl. No.: 12/869,561

(22) Filed: Aug. 26, 2010

(65) Prior Publication Data

US 2012/0053745 A1 Mar. 1, 2012

(51) Int. Cl.
*G05D 23/00* (2006.01)
(52) U.S. Cl. ........................... 700/276; 700/295
(58) Field of Classification Search .................. 700/19, 700/276, 277, 278, 295, 299, 300
See application file for complete search history.

(56) References Cited

U.S. PATENT DOCUMENTS

| 5,462,225 | A | 10/1995 | Massara |
| 7,364,093 | B2 * | 4/2008 | Garozzo ........................ 236/46 R |
| 2009/0216382 | A1 | 8/2009 | Ng |

FOREIGN PATENT DOCUMENTS

WO 2010088663 8/2010

* cited by examiner

*Primary Examiner* — Carlos Ortiz Rodriguez
(74) *Attorney, Agent, or Firm* — Smith Risley; Steven P. Wigmore

(57) ABSTRACT

A system for establishing local control of a space conditioning load includes a switch for controlling a flow of energy for a space conditioning load. Control logic is operatively coupled to the switch, for receiving control parameters associated with a direct load control event from a utility provider. The control logic may also measure room temperature based on received temperature signals and determine if a room temperature is greater a comfort temperature range. The control logic may eliminate operation of a direct load control program if the room temperature is greater than or equal to the comfort temperature range. The control logic may log and signal back to the utility provider that the comfort temperature range is exceeded. The control logic may then restore local control of the switch and initiate a temperature setback control to a thermostat for the remainder of the control period.

12 Claims, 4 Drawing Sheets

SYSTEM AND METHOD FOR ESTABLISHING LOCAL CONTROL OF A SPACE CONDITIONING LOAD DURING A DIRECT LOAD CONTROL EVENT

BACKGROUND

Utility providers face the problem of satisfying consumer demand for electrical energy during peak and off-peak demand periods. Total electrical energy demand varies significantly between the peak and off-peak demand periods. For example, energy demand typically peaks on a hot summer afternoon as a result of the widespread simultaneous operation of air conditioning systems, and energy demand subsequently drops during the off-peak period of the late evening. To accommodate very high peak demands, utility providers face options of investing in additional power generating capacity, buying power from other utilities having excess capacity, or using an electrical load management system to control the amount of electrical energy distributed over the electrical distribution network during peak energy demand periods by electrical load reductions, commonly referred to as load shedding.

As of this writing, many utility providers have turned to load shedding as the most viable option to address very high peak demands. Load shedding usually comprises "direct load control" or demand response programs. Direct load control is a method where utility providers may interrupt the loads of their consumers during critical demand times.

In exchange for permitting this interruption, the consumer generally receives more favorable energy rates because that customer is not consuming energy generated by the auxiliary or back-up devices of the utility provider which may be needed during very high peak energy demands.

As one example of load shedding, a homeowner on a direct load control program may find his air conditioner periodically interrupted on hot summer days by a switch operated by the utility provider. In exchange for permitting this remote operation of the switch, the homeowner's utility bill is generally lower than that of customers not on the direct load control plan. Other incentives include home owner compensation in exchange for participating in the program. This load cycling by the utility provider may reduce overall energy consumption when electricity demand is highest, thereby improving grid reliability and reducing energy costs for the utility provider.

There are typically two methods used to reduce HVAC load in a demand response program: a cycling method and temperature set back. The cycling method generally includes shutting off the compressor on a periodic basis that reduces the normal run time of the compressor. This method provides the utility with a known and controllable load reduction since the amount of run time reduction is directly controllable by the command issued.

A problem associated with the cycling method is that the indoor temperature will usually continually rise during the control event and there is no temperature cap to limit this rise. Depending on how long the control events lasts, on how well the home is insulated, and the outdoor temperature, the indoor temperature may raise to a level that is uncomfortable for the customer. Customers may be more reluctant to sign up for cycling programs if the temperature rise during the event is too high or unknown, thus driving up the cost for customer acquisition and results in higher program costs.

A second method for load reduction is to perform a temperature setback. Utilities can send a setback value, say thirty-four degrees, to all the thermostats so that the HVAC is now regulating the indoor temperature at a higher value than what the customer has set it for. Every degree of temperature setback usually results in some energy reduction from the HVAC system. This method may limit the indoor temperature rise— making it easier to market to customers.

To address the cycling problem, utility providers often establish maximum (cooling) and minimum (heating) temperature limits for the space being serviced by the HVAC system. So for a cooling scenario in the summer months, utility providers allow the load shedding program to be overridden or suspended temporarily when the maximum temperature is reached. In this way, the HVAC system may be provided with power and start operating again to cool the space coupled to the HVAC system. The problem with this solution is that the maximum and minimum temperature limits are set to be identical across all customers. Also, the direct load control program may resume once the temperature of the space has fallen below the maximum temperature.

Using identical maximum and minimum temperature limits across all customers by a utility provider does not account for differences in the construction of the various spaces of the customers being serviced. For example, a first building may be poorly insulated and may reach the maximum temperature on a hot day very quickly within an hour or two. Similarly, a second building may be well insulated but its space conditioning load may be improperly sized for the space.

Meanwhile, a third building may be well insulated and may have properly sized space conditioning load. In this situation, the third building may not reach the maximum temperature on a hot day until several hours, significantly more than the first building with poor insulation and/or a poorly sized space conditioning load. A person residing in the first building will be less likely to subscribe to the direct load control program of the utility provider since the first building will reach a maximum and uncomfortable temperature very quickly and frequently during a operation of a direct load control program.

Another method to reduce customer discomfort is to allow the customer to override that event when the indoor temperature rises too high. This reduces the energy reduction that the utility is seeking.

Another solution that has been proposed to address the problems associated with cycling load control is to modify cycling within the direct load control program and to resume normal cycling when a maximum or minimum temperature has been avoided. Cycling generally refers to a set period or length in time in which a space conditioning load is provided with power and without power. For example, a first cycle may have a predetermined length of thirty minutes. During this thirty minute window, power for the space conditioning load may be stopped for the first twenty minutes of the window, while during the remaining ten minutes of the window, power may be supplied to the space conditioning load.

One solution that has been suggested to address the discomfort by a consumer when a maximum temperature for a space has been reached on a hot day is to modify the first cycle noted above. The first cycle may be modified so that there is less time in which power is not provided to the space conditioning load. For example, the off-power time may be adjusted from twenty minutes to fifteen minutes so that power is now supplied to the space conditioning load for fifteen minutes instead of the lower value of ten minutes.

While this proposed solution of modifying cycling of a direct load control program may help a consumer to cool a space to avoid a maximum temperature on a hot day, the proposed solution requires that the normal cycling be resumed once the maximum temperature is avoided. As noted above, if a building is poorly insulated and/or it has an improperly sized space conditioning load, the consumer will likely experience the maximum temperature quickly and frequently while the direct load control program is being executed. Indoor temperatures may swing wildly as the cycling value changes from the original to the modified program and back.

Accordingly, what is needed is a system and method that may overcome the problems associated with conventional direct load control programs that do not account for differences that may exist across consumers with respect to insulation and/or sizes for the space conditioning loads. What is needed is a system that allows a customer or utility to control a maximum temperature rise under a direct load control program. Another need exists for a system that advises a utility provider on how many customers actually reached this maximum temperature rise to optimize their load control program.

SUMMARY OF THE DISCLOSURE

A method and system for establishing local control of a space conditioning load during a direct load control event issued by a utility provider are disclosed. The method includes receiving one or more control parameters associated with the direct load control event and measuring room temperature of a climate controlled space. The method further includes determining if the room temperature is one of greater than and equal to a comfort temperature range, then completely disabling direct load control of the space conditioning load from the utility provider, logging and signaling back to the utility provider that the temperature threshold is reached, and transitioning control to a temperature setback method.

A system for establishing local control of a space conditioning load during a direct load control event issued by a utility provider includes means for receiving one or more control parameters associated with the direct load control event and means for measuring room temperature of a climate controlled space. The system may also include means for determining if the room temperature is one of greater than and equal to a comfort temperature range and means for eliminating direct load control of the space conditioning load from the utility provider if the room temperature is one of greater than and equal to a comfort temperature range. The system may send a signal signal back to the utility provider when the room temperature has exceeded the comfort temperature range. The system also has means for transitioning to a temperature setback control of the space conditioning load.

A system for establishing local control of a space conditioning load is also described and it may include a switch for controlling a flow of energy. The system also has control logic operatively coupled to the switch, for receiving one or more control parameters associated with a direct load control event from a communications network. The control logic may also measure room temperature based on received temperature signals and determine if a room temperature is one of greater than and equal to a comfort temperature range. The control logic may eliminate operation of a direct load control program associated with the one or more control parameters received if the room temperature is one of greater than and equal to a comfort temperature range. The control logic may then restore local control of the switch.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

DETAILED DESCRIPTION

Figure 1A:
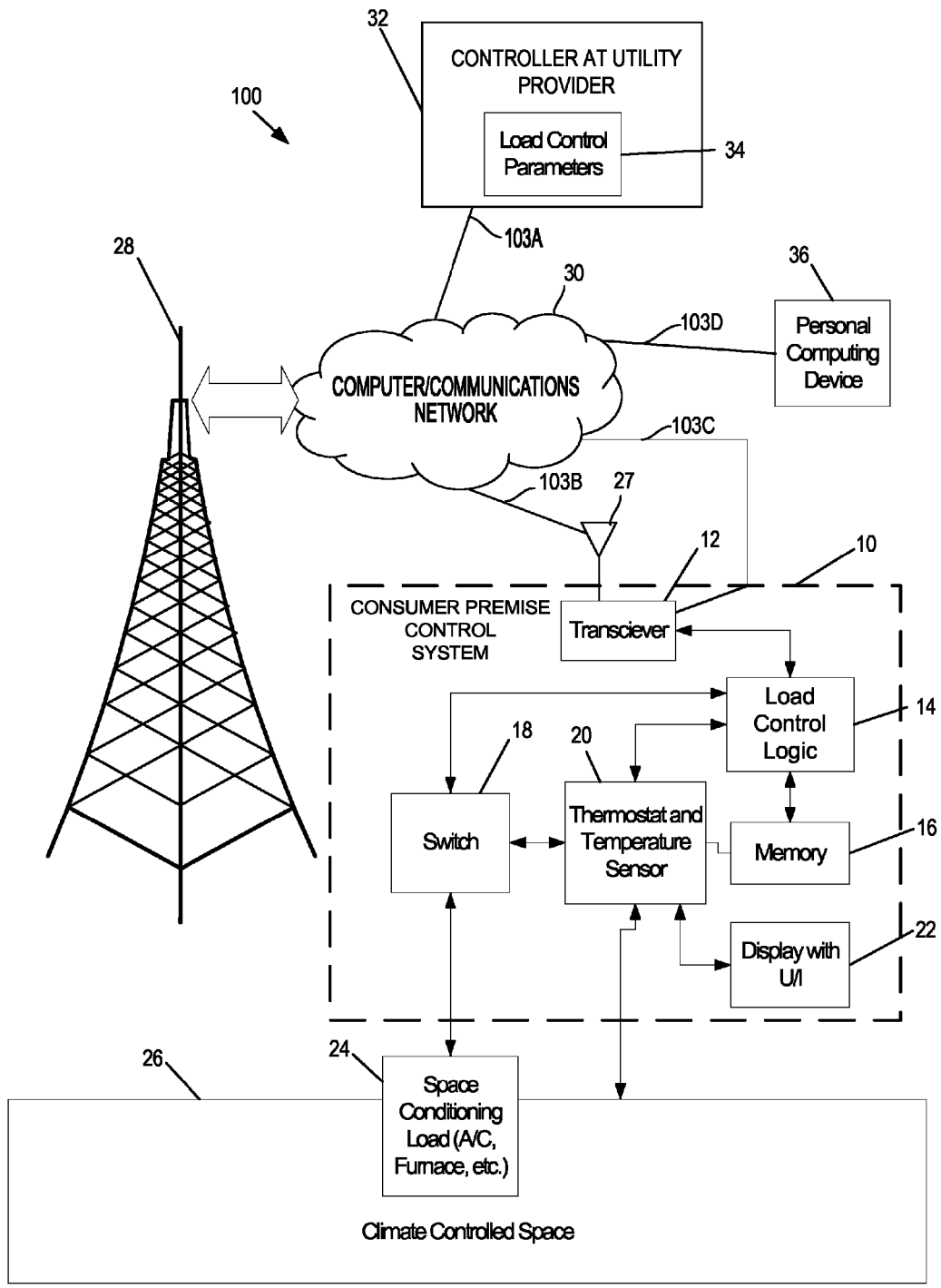
FIG. 1A is a diagram of a system for establishing local control during a direct load control program.

Referring initially to FIG. 1A, a diagram of a system 100 for establishing local control during a direct load control program is illustrated. The system 100 may include a customer premise control system 10, a space conditioning load 24, a climate controlled space 26, a wireless communications tower 28, a communications network 30, a controller 32 at a utility provider, and a personal computing device 36. Exemplary wireless communication networks that may employ wireless communications towers 28 or wireless environments in general include, but are not limited to, Advanced Metering Infrastructure (AMI) networks, Home Area Networks (HANs), any combination of the above, and other similar wireless communication networks. Many of the system elements illustrated in FIG. 1A are coupled via communications links 103A-D to the communications network 30.

The links 103 illustrated in FIG. 1A may comprise wired or wireless links. Wireless links include, but are not limited to, radio-frequency ("RF") links, infrared links, acoustic links, and other wireless mediums. The communications network 30 may comprise a wide area network ("WAN"), a local area network ("LAN"), the Internet, a Public Switched Telephony Network ("PSTN"), a power lines communication ("PLC") network, a paging network, or a combination thereof. The communications network 30 may be established by broadcast RF transceiver towers 28. However, one of ordinary skill in the art recognizes that other types of communication devices besides broadcast RF transceiver towers 28 are included within the scope of the invention for establishing the communications network 30.

The controller 32 at the utility provider may comprise a computer server that generates and stores various load control parameters 34 which are sent over the communications network 30 to the customer premise control system 10. Such load control parameters 34 may include, but are not limited to, the total duration of a utility cycling control event, a temperature delta value, and a duty cycle that defines the ratio of power removed from the space conditioning load and power provided to the conditioning load over a predefined period. These exemplary load control parameters 34 will be discussed in further detail below in connection with FIG. 3.

The personal computing device 36 which is coupled to the communication is network 30 may comprise a general purpose computer that may be operated by a customer to issue commands to the customer premise control system 10. Similarly, the personal computing device 36 may be operated by a utility provider for issuing commands to the controller 32 at the utility provider. In this description, the personal computing device 36 may include a cellular telephone, a pager, a PDA, a smartphone, a navigation device, a hand-held computer with a wireless connection or link, a lap-top, a desk top, or any other similar computing device.

The customer premise control system 10 may comprise a transceiver 12, an antenna 27, load control logic 14, a switch 18, a thermostat and temperature sensor 20, memory 16, and a display with a user interface 22. The transceiver 12 may comprise a communication unit such as a modem, a network card, or any other type of coder/decoder (CODEC) for receiving and sending load control signals to and from the communications network 30. In a wireless embodiment, the transceiver 12 may further comprise a radiofrequency circuit for generating radiofrequency communication signals which utilize the antenna 27 and that establish the wireless communications link 103B. In other embodiments, the transceiver 12 may be coupled to the communications network 30 by a direct wired communications link 103C.

While the elements of the customer premise control system 10 have been illustrated as contained within a single rectangular dashed box, one of ordinary skill in the art recognizes that any of these elements for the customer premise control system 10 may employ various different electronic packaging schemes without departing from the scope of the invention. That is, for example, the transceiver 12 may reside in a different housing relative to the load control logic 14. Similarly, the load control logic 14 may reside in a housing which is separate relative to the housing for the thermostat and temperature sensor 20. And lastly, all of the elements of the customer premise control system 10 may reside within a single housing without departing from the scope of the invention.

The load control logic 14 may comprise hardware or software or a combination thereof. The hardware may comprise a microprocessor running various types of software. The hardware may include electronics, such as application specific integrated circuits (ASICs) and the like. The load control logic 14 receives and processes signals from the transceiver 12 in order to control the switch 18 which supplies power to the space conditioning load 24.

The load control logic 14 and switch 18 may form a unit that is made similarly to the switch described in U.S. Pat. No. 5,462,225 issued in the name of Massara et al., the entire contents of which are hereby incorporated by reference. However, the load control logic 14 and switch 18 illustrated in FIG. 1A are not provided with any pre-set or predetermined maximum and minimum space temperature limits prior to installation of the load control logic 14 and switch 18 at a customer premises, as suggested by U.S. Pat. No. 5,462,225. The switch 18 is designed to control power supplied to the space conditioning load 24.

The load control logic 14 may comprise several timers: one for tracking load shed time; one for tracking load restore time; and one for tracking the length of a utility cycling control event, as described below in connection with FIGS. 2 and 3. The load control logic 14 allows the consumer to completely disable and override any commands issued under a direct load control event. The load control logic 14 allows the consumer to establish a comfort temperature range or temperature delta value 56 as described below in connection with FIG. 1B. In other exemplary embodiments, the utility provider may also establish the comfort temperature range or temperature delta value 56. This comfort temperature range or temperature delta value 56 allows a consumer or utility to completely stop or disable a direct load control of and if the climate controlled space exceeds the temperature value established by the temperature delta value 56.

The temperature delta value 56 may be established relative to a current room temperature or relative to a temperature set point of the thermostat 20. One of ordinary skill the art recognizes that a temperature delta value 56 relative to a current or absolute room temperature may be different compared to a set point of the thermostat 20. That is, one of ordinary skill in the art recognizes that a temperature set point of a thermostat 20 does not always reflect the current room temperature of a climate controlled space 26.

The transceiver 12 is coupled to the load control logic 14. The transceiver 12 may relay the load control parameters 34 from the controller 32 at the utility provider to the load control logic 14. The load control logic 14 may also transmit messages with the transceiver 12 to the controller 32 at the utility provider as well as to the personal computing device 36 via the communications network 30.

The transceiver 12 and load control logic 14 may be part of the device known as a digital control unit (DCU) manufactured by Comverge, Inc. The DCU is designed to be coupled outside of a dwelling near one or more parts of an HVAC system, such as near the compressor of an air-conditioning unit. The DCU may be used for communication through various channels including through wide area and local area networks. Another example of the load control logic 14 is a computational device like a computer or dedicated processing unit that is coupled to the space conditioning load 24.

The load control logic 14 may be coupled to memory 16. The memory 16 may comprise a volatile component or a non-volatile component, or a combination thereof. The non-volatile component may comprise read only memory (ROM). The ROM may store the operating system (OS) for the load control logic 14 which may be executed by a central processing unit and/or firmware of the load control logic 14 as understood by one of ordinary skill in the art.

The volatile component for the memory 16 of the customer premise control system 10 may comprise random access memory (RAM). The volatile memory component for the customer premise control system 10 may incorporate other different memory technologies, such as, but not limited to, erasable programmable read-only memory (EPROM) or electrically erasable programmable read-only memory (EEPROM), and/or flash memory and ferroelectric random access memory (FRAM).

Figure 3:
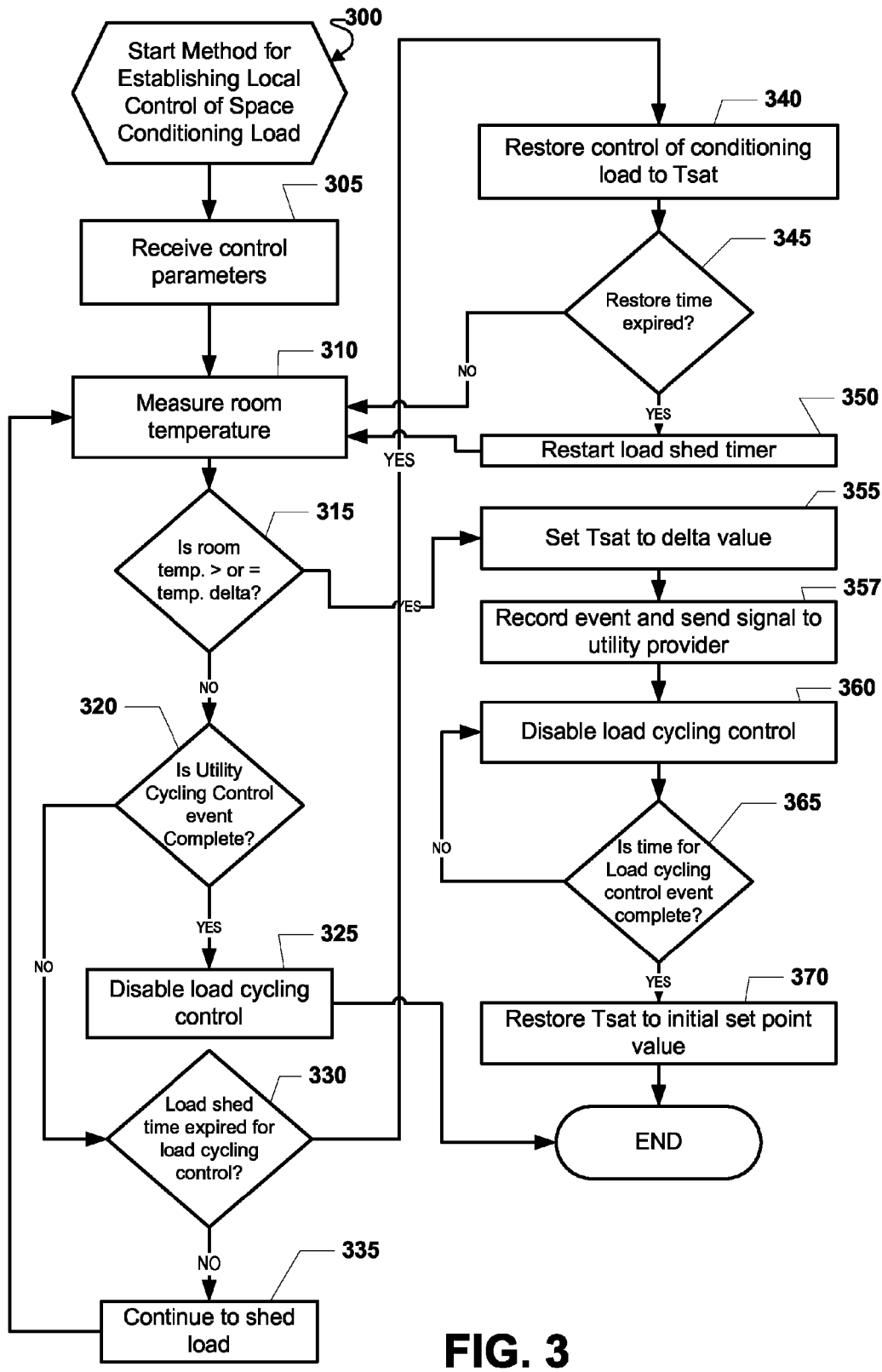
FIG. 3 is a flowchart illustrating a method for establishing local control during a direct load control program.

The memory 16 may store the instructions corresponding to the method illustrated in FIG. 3. The memory 16 may also record events detected by the load control logic 14 such as, but not limited to, actions taken by load control logic 14, data generated by the thermostat 20, load control parameters 34 transmitted by the controller 32 at the utility provider, and commands issued by the personal computing device 36 coupled to the communications network 30.

The load control logic 14 is also coupled to the thermostat 20. The thermostat 20 may comprise a programmable or intelligent thermostat that is usually positioned inside the climate controlled space 26. Exemplary programmable or intelligent thermostats known as of this writing include those manufactured by White Rogers or Honeywell. The temperature sensor may be implemented as a temperature measurement component, such as a thermistor, which senses space temperatures and outputs temperature signals representing measured space temperatures within the climate controlled space 26.

The thermostat and temperature sensor 20 may comprise a display having a user interface 22. Such a display having a user interface 22 may comprise a touch screen display such as a touch screen display generated by a liquid crystal display (LCD) or a light emitting diode (LED) display. Instead of a touch screen display, the display may not support touch commands but may instead work with a separate physical user interface such as a keypad, keyboard, and designated function buttons as understood by one of ordinary skill in the art. One exemplary embodiment of the display with user interface 22 is illustrated and described below in connection with FIG. 1B.

The space conditioning load 24 is coupled to the switch 18 which is in turn coupled to the load control logic 14. The space conditioning load 24 may comprise a heating, ventilating, air-conditioning (HVAC) system as understood by one of ordinary skill in the art. If the space conditioning load 24 is an air-conditioning system, the switch 18 restores distribution of electrical power to the compressor of the space conditioning load 24. Alternatively, if the space conditioning load 24 is a forced air heating system or a heat pump, the switch 18 restores electrical power to either the fan of a furnace or the compressor of a heat pump.

The climate controlled space 26 may comprise any type of room or volume within a building which is fully closed off or partially closed off relative to the outside. The climate controlled space 26 may comprise a single room or a plurality of rooms joined together by an air ventilation system.

Figure 1B:
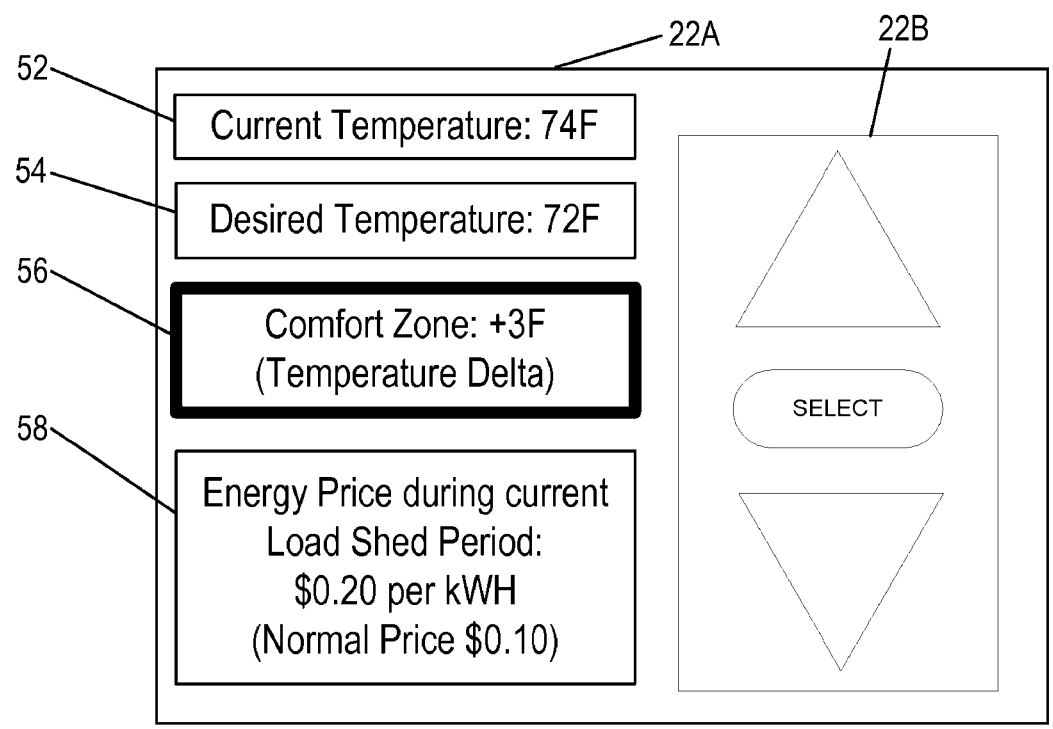
FIG. 1B is a front view of an exemplary display with a user interface for a customer premise control system that helps a consumer establish local control during a direct load control program.

Referring now to FIG. 1B, this figure is a front view of an exemplary display 22A with a user interface 22B for a customer premise control system 10 that helps a consumer establish local control during a direct load control program. The exemplary display 22A may comprise a touch screen display that includes a predefined area having a user interface 22B. In the exemplary embodiment illustrated in FIG. 1B, the user interface 22B comprises screen controls that are represented by geometric shapes, such as arrowheads, which allow a user to select various values by pressing the arrow heads for selecting values in a desired direction, such as up or down for temperature control. However, other types of user interfaces 22B are included within the scope of the invention and may include, but are not limited to, keyboards, keypads, and function specific buttons as understood by one of ordinary skill the art.

The exemplary display 22A of FIG. 1B presents a current temperature 52 that has an exemplary magnitude of 74° F.; a desired temperature 54 having an exemplary magnitude of 72° F.; a comfort zone range or temperature delta value 56 that has an exemplary magnitude of +3° F.; and an energy price value 58 that conveys to a user the energy price during the current load shed period expressed in kilowatts per hour.

The comfort zone range or temperature delta value 56 has been provided with a thicker border to indicate that it is the value which can be presently adjusted with the user interface 22B, or set by the utility provider in other exemplary embodiments. In other words, the comfort zone range or temperature delta value 56 may be adjusted up or down by the consumer by pressing the arrow keys of the user interface 22B, or the value 56 may be sent by the utility provider as part of the load control event command.

The comfort zone range or temperature delta value 56 corresponds to a range expressed in degrees Fahrenheit which may be selected by a user of the customer premise control system 10. This temperature range or temperature delta value 56 is the maximum range relative to a temperature set point, which is the desired temperature 54, or relative to a current temperature 52 of the thermostat 20 that a user will allow the temperature of the climate controlled space 26 to reach while the space conditioning load 24 is under a direct load control program provided by the controller 32 at the utility provider.

So, in a hot weather example, the temperature delta value 56 is the maximum temperature that the consumer or utility provider will allow the climate controlled space 26 to reach relative to the desired temperature 54 (temperature set point of thermostat 20) before the control strategy is shifted from cycling control to a temperature setback control. It is noted that if the temperature delta value 56 is set relative to the current measured temperature 52 by the thermostat 20, then this would mean that the room temperature of the climate controlled space 26 would need to hit the maximum temperature of 77° F. if the comfort zone or temperature delta value 56 is set equal to 3° F. relative to the current temperature 52 listed as 74° F. in a hot weather example.

Similarly, in a cold weather example (which is a heating scenario), temperature delta or comfort zone temperature 56 is the lowest temperature relative to the set point temperature 54 or the current temperature measured by the thermostat 20 that the consumer or utility will allow the climate controlled space 26 to reach before the control strategy is shifted from cycling control to a temperature setback control.

The energy price value 58 may be supplied to the thermostat 20 by the controller 32 at the utility provider. The energy price value 58 will remind the consumer of how much energy may cost the consumer if the consumer desires to keep the climate controlled space 26 very close to the desired temperature value 54 while disabling or stopping control of the direct load control commands issued by the controller 32 at the utility provider.

Figure 2:
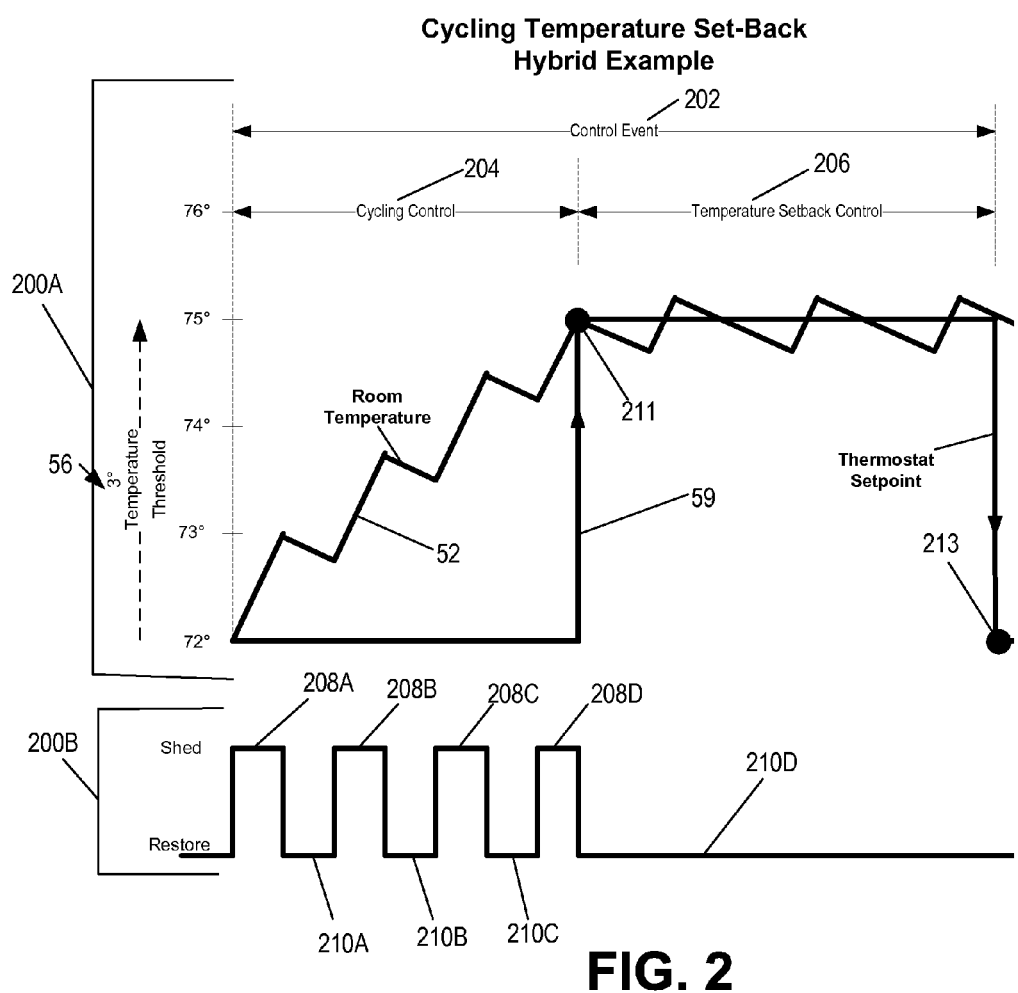
FIG. 2 is a graph that includes plots of temperature versus time and power supply versus time for a method and system that establish local control during a direct load control program.

FIG. 2 is a graph 200 that includes a plot 200A of temperature versus time and a plot 200B of power supply versus time for a method and system that establish local control during a direct load control program. Looking at the first plot 200A, the controller 32 at the utility provider may issue load control parameters 34 of a load control event that has a first desired length 202. The load control event may have an exemplary length 202 or duration of four hours, however, other magnitudes for a load control event are included within the scope of the invention. In the exemplary scenario illustrated in FIG. 2, the intended length 202 for the cycling strategy is cut short, well before its intended four hour length, after approximately one hour and forty minutes as indicated by the length 204 of the cycling control period which is beneath the length 202 for the load control event.

Adjacent to the length 204 of the cycling control period is a length 206 corresponding to a local control or temperature setback control period provided to the thermostat 20. The plot 200A includes a first line 52 representing the room temperature and a second line 59 representing the thermostat set point.

The first line 52 gradually rises from a room temperature of 72° F. to a temperature of 75° F. while the space conditioning load 24 is under a direct load control program that is illustrated by the second plot 200B of FIG. 2. The second plot 200B illustrates an exemplary cycling strategy comprising thirty minute intervals. For each thirty minute interval, there is a load shed time 208 comprising a magnitude of twenty minutes and a restore time 210 comprising a magnitude of 10 minutes.

During the load shed time 208, the switch 18 is activated by the load control logic 14 such that energy or power is removed from the space conditioning load 24. Conversely, during the restore time 210, the switch 18 is activated by the load control logic 14 such that energy or power is supplied or provided to the space conditioning load 24 so that the temperature of the climate controlled space 26 may be adjusted. One of ordinary skill in the art will recognize that other magnitudes for the load shed time 208, the restore time 210, and the length of the intervals of the load control event may be varied without departing from the scope of the invention.

The second plot 200B illustrates how temperature within the climate controlled space 26 may rise while a space conditioning load 24 is under control of a direct load control event in a hot weather example. Specifically, during the first load shed time 208A, the temperature within the climate controlled space 26 may rise from 72° F. to 73° F. After the first load shed time 208A, and during the first restore time 210A, the temperature of the climate controlled space 26 may fall below 73° F. since the space conditioning load 24 is allowed to cool the climate controlled space 26.

However, during the second load shed time 208B, the temperature within the climate controlled space 26 may rise from 73° F. to 74° F. After the second load shed time 208B and during the second restore time 210B the temperature of the climate controlled space 26 may be moved down from 74° F., etc.

One of ordinary skill in the art will recognize that the slope of the room temperature 52 may drastically increase for climate controlled spaces 26 in which the space conditioning load 24 is improperly sized and/or if the climate controlled space 26 is not well insulated.

The second plot 200B illustrates that the fourth load shed time 208D is cut short since the temperature delta value 56 having a magnitude of 3° F. was reached when the room temperature 52 hit the temperature of 75° F. (which is 3° F. above the thermostat set point 54 of 72° F. as illustrated in FIG. 1B). The fourth load shed time 308D was cut short since the load control logic 14 was constantly comparing the temperature delta value 56 against the room temperature 52. When the load control logic 14 determines that the temperature delta value 56 was reached, then the load control logic 14 disabled the remote control from the direct load control program supplied by the controller 32 of the utility provider.

At point 211 along the room temperature plot 52, the load control logic 14 canceled or completely disabled the direct load control program and returned control of the space conditioning load 24 over to the thermostat 20. Also at point 211, the load control logic 14 changed the set point temperature 54 of the thermostat from 72° F. to 75° F., which corresponds to the desired values illustrated in the example of FIG. 1B. One of ordinary skill in the art will appreciate that logic should be implemented to ensure that the transfer of control from cycling to temperature setback should not cause short-cycling of the compressor. In addition, the load control logic 14 send a signal comprising an activity log back to the utility via the transceiver 12 that the temperature threshold is reached.

The remaining plot of the room temperature from point 211 towards the right and towards point 213 reflects how the room temperature of the climate controlled space 26 was adjusted while under control of the thermostat 20. After the load control event ends, at point 213, on the second plot 59 for the thermostat temperature set point, the load control logic 14 changes the value of the thermostat temperature set point 54 from a value of 75° F. to 72° F. One of ordinary skill in the art will appreciate that other units of measure beyond the English units of measure that are described herein may be utilized, such as the metric system and temperature in degrees Celsius, without departing from the scope of the invention.

With respect to the temperature set back control segment 205 of FIG. 2, one of ordinary skill the art recognizes that a thermostat 20 may be provided with predetermined or factory-set algorithms built-in in order to efficiently control room temperature of a climate controlled space. The thermostat 20 may anticipate rises and falls in room temperature and activate the space conditioning load 24 appropriately in order to keep the temperature of the climate controlled space 26 very close to the desired temperature reflected in the set point temperature 54.

While the first plot 200A illustrates that the full energy savings from a direct load control program was not realized, the first plot 200A also illustrates a unique balance between energy conservation and promoting temperature comfort for a consumer. That is, during the cycling control segment 204 of the first plot 200A which was produced by the direct load control program provided by the controller 32 at the utility provider, a significant energy reduction was realized by the utility provider. Meanwhile, during the same segment 204, the consumer experienced some temperature discomfort relative to the climate controlled space 26.

Then, during the second segment 206 of the first plot 200A, energy savings for the utility provider are marginal, however, the consumer is afforded with a limit on the temperature rise of the climate controlled space 26. By using the thermostat as the temperature control mechanism and not the time-based algorithms of the load control logic 14, the indoor temperature becomes more well behaved and limited to the temperature delta 56 during segment 206 of the first plot 200A. In view of these two segments 204 and 206, energy savings for the utility provider are realized while temperature comfort for a consumer is provided so that the consumer will be more willing to participate in a direct load control program offered by the utility provider.

In a particular aspect, one or more of the method steps described herein may be stored in the memory 16 as computer program instructions. These instructions may be executed by the load control logic 14 and thermostat 20 to perform the methods described herein. Further, a processor that is part of the load control logic 14, the memory 16, the thermostat 20, or a combination thereof may serve as a means for executing one or more of the method steps described herein.

FIG. 3 is a flowchart illustrating a method 300 for establishing local control during a direct load control program. Step 305 is the first step of the method 300 for establishing local control during a direct load control program. In step 305 control parameters may be received by the load control logic 14 of the customer premise control system 10. The control parameters may comprise the load control parameters 34 issued by the controller 32 at the utility provider. The load control parameters 34 may comprise a length or duration of a load control event, the temperature delta value 56, shed time 208, and restored time 210 set for each period of the load control event.

In step 305, the load control logic 14 may receive the comfort zone range or temperature delta value 56 via the user interface 22B as illustrated in FIG. 1B. The load control logic 14 may also receive the desired temperature or temperature set point value 54 of the thermostat 20 via the user interface 22B of FIG. 1B. Alternatively, or in addition to the user interface 22B, the load control logic 14 may receive any one or all of these parameters from the consumer operating a personal computing device 36 which is coupled to the communications network 30. While the controller 32 at the utility provider may provide the temperature delta value 56, according to a preferred exemplary implementation, the temperature delta value 56 may be set or established by the consumer using the user interface 22 of the FIG. 1B or a personal computing device 36 of FIG. 1A.

Next, in step 310 the thermostat and temperature sensor 20 may measure the room temperature of the climate controlled space 26 and report this data to the load control logic 14.

Alternatively, or in addition to, the load control logic 14 may ping or request temperature data from the thermostat and temperature sensor 20.

Subsequently, in decision step 315, the load control logic 14 may determine if the room temperature is greater than or equal to the temperature delta value 56 that was received in step 305. If the inquiry to decision step 315 is negative, then the "No" branch is followed to decision step 320. One example of a negative inquiry is illustrated in FIG. 2 when the room temperature is at a value of 73° F. which is 2° F. below the temperature delta value 56 comprising 3° F. or 75° F.

If the inquiry to decision step 315 is positive, then the "Yes" branch is followed to step 355 in which the thermostat set point value 54 is changed to the temperature delta value 56. A positive inquiry to decision step 315 is illustrated in FIG. 2 at point 211 on the room temperature plot 52. At point 211 in FIG. 2, the temperature of the climate controlled space 26 reached 75° F. which is equal to the sum of the temperature delta value 56 added to the desired temperature value or current temperature set point 54 of the thermostat 20.

In decision step 320, the load control logic 14 determines if the utility cycling control event having a duration 202 as measured by a cycling control event timer is complete. If the inquiry to decision step 320 is positive, then the "Yes" branch is followed to step 325 in which the load control logic 14 this enables the load cycling control event. The process then ends after step 325.

If the inquiry to decision step 320 is negative, then the "No" branch is followed to decision step 330. In decision step 330, the load control logic 14 and specifically, a load shed timer, of the load control logic 14 may determine if the load shed time 208 for the current load cycle has expired. If the inquiry to decision step 330 is negative, then the "No" branch is followed to step 335 in which load shedding relative to the space conditioning load 24 is continued. The process then returns back to step 310 in which the room temperature is measured.

If the inquiry to decision step 330 is positive, then the "Yes" branch is followed to step 340 in which the control of the space conditioning load 24 is returned to the thermostat and temperature sensor 20. An example of a positive inquiry to decision step 330 exists in FIG. 2 after the duration of the first shed time 208A. At the first point of the restore time 210A, control of the switch 18 is given back to the thermostat 20.

Next, in decision step 345, the load control logic 14 determines if the timer for the restore time 210 has expired. Referring back to FIG. 2, the shed time 208 for each cycle or period of the example illustrated in this Figure was set to twenty minutes while the restore time 210 for each period or cycle was set to ten minutes. In decision step 345, the load control logic 14 determines if the ten minute duration set for the restore time 210 has expired for the example illustrated in FIG. 2.

If the inquiry to decision step 345 is negative, then the "No" branch is followed back to step 310 in which the room temperature is measured. If the inquiry to decision step 345 is positive, then the "Yes" branch is followed to step 350 in which the load shed timer of the load control logic 14 is reset or restarted. The process then proceeds back to step 310 in which the room temperature is measured.

Referring now again to step 355, this step illustrates thermostat 20 being set to the temperature delta value or comfort zone value 56 since the load control logic 14 determines that the room temperature is equal or greater to the temperature delta value 56 relative to either a thermostat set point value 54 or the current room temperature 52 when the temperature delta value 56 was established. In other words, as noted previously, the temperature delta value or comfort zone range 56 may be set relative to a thermostat set point temperature 54 or relative to a current temperature of the climate controlled space 26. In a preferred and exemplary embodiment, usually the comfort zone temperature value or temperature delta value 56 will be set relative to the temperature set point value 54.

As noted previously, step 355 corresponds to point 211 on the plot 52 of the room temperature in which the load control logic 14 changes the temperature set point value 54 of the thermostat 20 to a new value based on the comfort zone range or temperature delta value 56 by adding the temperature delta value 56 to the original or first thermostat set point temperature 54. In the exemplary embodiment illustrated in FIG. 1B, this means that the thermostat temperature set point value 54 is changed from 72° F. to 75° F. (which corresponds to the temperature delta value 56 of 3° F. being added to the temperature set point value 54 having a magnitude of 72° F.).

Next, in step 357, the load control logic 14 may maintain a log that the temperature threshold is reached, that the direct load control cycling program is stopped, and that temperature setback mode is entered. In a two-way system, the load control logic 14 in step may transmit a message back to the utility via the transceiver 12 that the temperature threshold is reached.

Next, in step 360, the load control logic 14 disables the direct load control cycling program and its corresponding load control parameters 34 that were transmitted to the load control logic 14 in step 305. This disabling of the direct load control cycling program by the load control logic 14 restores local control of the space conditioning load 24 to the thermostat 20.

The load control logic 14 logs that the temperature threshold is reached, direct load control cycling program is stopped, and that temperature setback mode is entered. In a two-way system, the load control logic 14 may transmit a message back to the utility via the transceiver 12 that the temperature threshold is reached.

Subsequently, in decision step 365, the load control logic 14 determines if the duration 202 of the load cycling control event is complete. If the inquiry to decision step 365 is negative, then the "No" branch is followed back to step 360. If the inquiry to decision step 365 is positive, then the "Yes" branch is followed to step 370 in which the load control logic 14 restores the thermostat temperature set point value 54 back to its initial value. In the exemplary embodiment illustrated in FIG. 2, this means that the load control logic 14 changes the current thermostat temperature set point value 54 of 75° F. to 72° F. as illustrated by point 213 of the plot 52 of room temperature in FIG. 2. The process 300 then ends.

The word "exemplary" is used in this description to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, a personal computing device may include a cellular telephone, a pager, a PDA, a smart phone, a navigation device, or a hand-held computer with a wireless connection or link.

Further, certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a tangible computer-readable medium. Computer-readable media include both tangible computer storage media and tangible communication media including any tangible medium that facilitates transfer of a computer program from one place to another. A tangible computer storage media may be any available tangible media that may be accessed by a computer. By way of example, and not limitation, such tangible computer-readable media may comprise RAM, ROM, EEPROM, CD-ROM or other optical disk storage, magnetic disk storage or other magnetic storage devices, or any other tangible medium that may be used to carry or store desired program code in the form of instructions or data structures and that may be accessed by a computer.

Also, any connection is properly termed a tangible computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, and DSL are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for establishing local control of a space conditioning load during a direct load control event having a duration and issued by a utility provider, comprising:
    receiving one or more control parameters associated with the direct load control event from the utility provider;
    initiating climate control, commanded by a load control logic, to maintain a room temperature of a climate controlled space within a comfort temperature range, the comfort temperature range comprising a temperature threshold value set relative to a desired temperature set point of a thermostat;
    automatically measuring the room temperature during the direct load control event;
    automatically determining, by the load control logic, if the temperature threshold value is reached during the direct load control event;
    when the load control logic determines that the temperature threshold value is reached, the load control logic automatically and completely disables direct load control of the space conditioning load from the utility provider, setting a new temperature set point of the thermostat to the temperature threshold value, and automatically transitioning control to a temperature setback method of the thermostat;
    performing the temperature setback method of the thermostat until the direct load control event duration expires; and
    when the load control logic determines that the direct load control event duration expires, changing the new temperature set point of the thermostat back to the desired temperature set point.

2. The method of claim 1, wherein the one or more control parameters comprise at least one of a duration for the direct load control event, parameters associating with cycling a space conditioning load, load shed time, and load restore time.

3. The method of claim 1, wherein the thermostat comprises one of a touch screen display, a key pad, a key board, and a button.

4. The method of claim 1, wherein the space conditioning load comprises at least one of an air conditioner and a furnace.

5. A system for establishing local control of a space conditioning load during a direct load control event having a duration and issued by a utility provider, comprising:
    a memory storing a load control logic;

means for receiving one or more control parameters associated with the direct load control event from the utility provider;

the load control logic initiating climate control, to maintain a room temperature of a climate controlled space within a comfort temperature range, the comfort temperature range comprising a temperature threshold value set relative to a desired temperature set point of a thermostat;

means for automatically measuring the room temperature during the direct load control event;

the load control logic automatically determining if the temperature threshold value is reached;

means for automatically eliminating direct load control of the space conditioning load from the utility provider, when the load control logic determines that the temperature threshold value is reached;

the load control logic setting a new temperature set point of the thermostat to the temperature threshold value for a temperature setback method of the thermostat;

means for automatically transitioning to the temperature setback method of the thermostat, the temperature setback method of the thermostat is performed with the new set point temperature until the direct load control event duration expires;

the load control logic, changing the new temperature set point of the thermostat to the desired temperature set point, when the load control logic determines that the direct load control event duration expires; and means for automatically logging and signaling to the utility provider that the temperature threshold value is reached.

6. The system of claim 5, wherein the one or more control parameters comprise at least one of a duration for the direct load control event, parameters associating with cycling a space conditioning load, load shed time, and load restore time.

7. The system of claim 5, wherein the thermostat comprises a user interface that comprises one of a touch screen display, a key pad, a key board, and a button.

8. The system of claim 5, wherein the space conditioning load comprises at least one of an air conditioner and a furnace.

9. A system for establishing local control of a space conditioning load, comprising:

a switch for controlling a flow of energy to the space conditioning load;

a memory storing a load control logic;

a thermostat coupled to the load control logic;

the load control logic operatively coupled to the switch, for receiving one or more control parameters associated with a direct load control event from a communications network, and for initiating climate control to maintain a room temperature within a comfort temperature range, the comfort temperature range comprising a temperature threshold set relative to a desired temperature set point of the thermostat;

the load control logic for automatically measuring the room temperature based on received temperature signals during the direct load control event, for automatically determining if the temperature threshold is reached, and for automatically eliminating operation of a direct load control program associated with the one or more control parameters, when the temperature threshold is reached during the direct load control event;

the load control logic for setting a new temperature set point of the thermostat to the temperature threshold, and for automatically transitioning control to a temperature setback method of the thermostat by restoring control to the switch, the temperature setback method of the thermostat is performed with the new temperature set point until a duration of the direct load control event expires; and the load control logic for changing the new temperature set point of the thermostat to the desired temperature set point when the direct load control event duration expires.

10. The system of claim 9, further comprising memory for storing instructions and the one or more control parameters.

11. The system of claim 10, wherein the memory for storing the instructions and the one or more control parameters comprises one of a volatile component and a non-volatile component.

12. The system of claim 9, further comprising a display.

* * * * *